United States Patent Office 3,572,416
Patented Mar. 23, 1971

3,572,416
STIMULATION OF PRODUCING WELLS
Wilson L. Kinney, Findlay, Ohio, and Walter B. Kirk, Jr., Robinson, Ill., assignors to Marathon Oil Company, Findlay, Ohio
No Drawing. Filed Nov. 6, 1969, Ser. No. 874,670
Int. Cl. E21b 43/27
U.S. Cl. 166—307
24 Claims

ABSTRACT OF THE DISCLOSURE

Hydrocarbon production from a producing well in fluid communication with a hydrocarbon-bearing subterranean formation is improved by injecting sequentially into the formation 1–500 gallons of acid per vertical foot of hydrocarbon-bearing formation, 0.1–10 volumes of water per volume of acid and 1–500 gallons of micellar dispersion per vertical foot of hydrocarbon-bearing formation and then displacing the acid and micellar dispersion out into the formation with a drive fluid, preferably a hydrocarbon drive fluid in an oil-wet formation. Thereafter, the producing well is permitted to reproduce. The acid and micellar dispersion can remain in contact with hydrocarbon-bearing formation up to about six hours before being displaced out into the formation.

BACKGROUND OF THE INVENTION

U.S. 2,356,205 to Blair, Jr. et al. teaches that productivity of a producing well can be increased by removing wax-associated occlusions within the immediate vicinity of the wellbore. This is accomplished by contacting the strata with a micellar solution (the solution tends to solubilize the occlusions) and then permitting the well to backflow to remove the objectionable occlusions uphole.

U.S. 3,254,714 to Gogarty et al. teaches injecting a micellar dispersion into a formation and displacing it therethrough to recover crude oil through a production means in fluid communication with the reservoir. Such process is very effective in secondary and tertiary oil recovery processes.

U.S. 3,470,958, filed Mar. 12, 1968, to Kinney teaches improving the production from a producing well by injecting into the formation a micellar dispersion and displacing it out into the formation with a hydrocarbon drive fluid.

Also, the prior art teaches that acidizing, e.g. with hydrochloric acid, tends to "open" the formation to permit increased flow of fluids. Such is accomplished by dissolving limestone (may have been deposited from waters during production) to "open" the pore space adjacent the wellbore and thus permit or facilitate the flow of fluids into the wellbore.

SUMMARY OF THE INVENTION

Applicants have discovered that the stimulation of producing wells can be improved by preceding the injection of a slug of micellar solution with a slug of an acid effective to chemically attack deposits of scale on the wellbore, undesirable waxes, etc. Examples of useful amounts of acid include from about 1 to about 500 gallons of the acid per vertical foot of oil-bearing formation. Examples of micellar solution include from about 1 to about 500 gallons of the micellar solution per vertical foot of oil-bearing formation. Thereafter, there is injected a drive fluid, to displace the acid and micellar dispersion out into the formation. Where the formation is oil-wet, a substantially hydrocarbon drive fluid can be used. A substantially aqueous drive fluid is useful where the formation is water-wet. Preferably, the acid slug is followed by sufficient amounts of water to "insulate" it from the micellar dispersion, e.g. 0.1–10 volumes of water per volume of acid.

DESCRIPTION OF THE INVENTION

Acids useful with this invention include any acid which will cause an increase in the flow of fluids in the hydrocarbon-bearing formation. For example, the acid can chemically attack well bore deposits of scale such as iron sulfide, can solubilize carbonate deposits, solubilize wax and other deposits of objectionable hydrocarbons, etc. Examples of useful acids include hydrochloric, nitric, acetic, sulfuric, combination of hydrochloric and nitric, and other inorganic and organic acids. The acid can contain sequestering agents, surface active agents, corrosion inhibitors, agents to lower the viscosity of the acid, de-emulsifying agents, etc. Strength of the acid can vary, e.g. where hydrochloric acid is used it can vary in concentration from about 5 to about 38%. Concentrations of lesser or larger amounts of acids are also useful and such concentrations may depend upon the particular desires of the user.

Generally from about 1 to about 500 gallons of the acid per vertical foot of the oil-bearing formation gives improved results with this invention. Smaller or larger amounts of the acid are also useful and such amounts will depend upon the desired economics and the conditions of the reservoir to obtain the most feasible dollar return for the money invested. Where large deposits of carbonate scale, iron sulfide scale, etc. are present, large amounts of acid are preferred. Amounts within the range of from about 5 to about 250 gallons per vertical foot of oil-bearing sand give satisfactory results and more preferably from about 25 to about 200 gallons per vertical foot of formation.

The term "micellar dispersion" as used herein is meant to include micellar solutions, "micro-emulsions" [Schulman and Montagne, Annals of the New York Academy of Sciences, 92, pages 366–371 (1961)], "transparent" emulsions (Blair, Jr. et al., United States Pat. No. 2,356,205) and micellar dispersion technology taught by C. G. Sumner, Clayton's, The Theory of Emulsions and Their Technical Treatment, 5th edition, pages 315–320 (1954). Examples of useful micellar dispersions include those taught in United States Pat. Nos. 3,254,714; 3,275,075; 3,301,325; 3,307,628; 3,330,344; and 3,348,611. The micellar dispersion can be oil-external or water-external.

The micellar dispersion is comprised of hydrocarbon, aqueous medium, and at least one surfactant. One or more cosurfactants (also identified as cosolvents, co-solubilizers, and semi-polar organic compounds) are useful in the dispersions. Also, electrolytes are useful in the dispersions. The micellar dispersion is, for purposes of this invention, relatively stable dispersion and can show some Tyndall effect, but generally does not. Also, the micellar dispersion can contain other additives, e.g. corrosion and scale inhibitors, bactericides, etc. Examples of useful dispersions include those containing, by volume, from about 4% to about 85% hydrocarbon; from about 5 to about 90% water, at least about 4% surfactant, from about 0.01 to about 20% or more by volume of cosurfactant and from about 0.001 or less up to about 5% or more by weight of electrolyte in the aqueous phase.

Examples of preferred surfactants are the petroleum sulfonates having at least about 50% active sulfonate. It is preferred that the sulfonate have an average equivalent weight within the range of from about 360 to about 520, and more preferably from about 400 to about 470. The surfactant can be a mixture of low and high average equivalent weight sulfonates or a mixture of one or more sulfonates and other surfactants. The hydrocarbon can be crude oil, extract of crude oil, or synthesized hydrocarbon. Useful aqueous medium includes soft, brackish or brine water.

Examples of useful cosurfactants include alcohols, amino compounds, esters, aldehydes and ketones containing from 1 up to about 20 or more carbon atoms and more preferably from about 3 to about 16 carbon atoms.

Electrolytes useful within the micellar dispersions include inorganic bases, inorganic acids, inorganic salts, organic bases, organic acids, and organic salts. Examples of useful electrolytes include those found in U.S. Pat. No. 3,330,344.

The amount of acid and micellar dispersion injected into the formation depends upon the thickness of the hydrocarbon-bearing formation or "pay" sand (that is, the permeable part of the formation containing crude oil or in fluid communication with crude oil in amounts feasible for recovering), the amount of objectionable deposits that adversely affect the productivity index, etc. Examples of oil-bearing sand thicknesses include from about 4 feet or less to about 3,000 feet or possibly higher. From about 1 to about 500 gallons of micellar dispersion per vertical foot of hydrocarbon-bearing formation are useful with this invention. Larger quantities may be useful; however, the increased cost associated therewith generally is not favorable with results obtained. Smaller amounts may be useful, but the indicated amounts are considered optimum for the process. Generally from about 25 to about 250 gallons of the micellar dispersion per vertical foot of hydrocarbon-bearing formation give significant increases in the productivity index of a producing well.

The mobility of the acid and micellar dispersion flowing in the formation is preferably about equal to or greater than that of the mobility of the formation fluids (i.e. interstitial water and oil) flowing in the reservoir. However, in certain cases it may be preferred that the mobilities be less than that of the formation fluid.

Preferably, the acid and dispersion are injected into the formation at a pressure below the formation fracture pressure. However, either or both can be injected at pressures exceeding the formation fracture pressure.

After the acid is injected into the formation, it is preferred that water is injected to displace the acid out into the formation. Injection of the water slug between the acid slug and the micellar dispersion slug acts as a "spacer" and "insulates" the acid from the micellar dispersion. Generally, from about 0.1 to about 10 volumes of water per volume of acid is useful and more preferably from about 0.5 to about 5 volumes of water per volume of acid. After the water is injected into the formation, the micellar dispersion is injected.

The acid and the micellar dispersion may be permitted to remain in contact with the hydrocarbon-bearing formation for a period of time up to about six hours. Generally up to about 0.5 hour of contact time is preferred to permit the acid to attack the formation; however, in most reservoirs no contact time for the acid is needed.

After the micellar dispersion is injected into the formation, there is injected a drive fluid to displace the acid and micellar dispersion out into the formation. The fluid can be substantially hydrocarbon drive fluid. Examples of useful hydrocarbon drive fluids include crude oil, extracts of crude oil such as diesel fuel, gasoline, kerosene, liquefied petroleum gases, etc. In some cases it may even be desired to incorporate other additives within the substantially hydrocarbon drive fluid to impart desired characteristics to the process or the formation. For example, additives that will impart a more oleophilic character to the hydrocarbon drive fluid may be useful. Liquid as well as gaseous or combinations of liquid and gaseous substantially hydrocarbon drive fluids are useful with the invention. Preferably, the acid and the micellar dispersion are displaced out into the formation to a distance of at least about 7.5 feet in radius and more preferably 12 to 20 feet in radius away from the wellbore.

Where the formation is water wet, the drive fluid can be an aqueous fluid or substantially aqueous fluid. Additions such as corrosion and scale inhibitors, bactericides, de-emulsifying agents can be incorporated into the aqueous fluid as well as the hydrocarbon drive fluid.

After the acid and micellar dispersion are displaced out into the formation, the production well is permitted to return to production; increased oil recoveries are realized. As a result, the productivity index of the producing well is increased to facilitate movement of the hydrocarbon from the hydrocarbon-bearing formation out into the wellbore.

The invention is not meant to be limited by the specifics taught herein. Rather, all equivalents obvious to those skilled in the art are meant to be included within the scope of the invention as defined in the specification and appended claims.

What is claimed is:

1. A process for improving the productivity index of a producing well in fluid communication with a hydrocarbon-bearing formation comprising:
    (1) injecting into the well a sufficient amount of acid to improve the productivity index of the well,
    (2) injecting into the well from about 1 to about 500 gallons per vertical foot of hydrocarbon-bearing formation, a micellar dispersion,
    (3) injecting a drive fluid into the well to displace the acid and micellar dispersion out into the formation, and
    (4) permitting the well to reproduce.

2. The process of claim 1 wherein from about 1 to about 500 gallons of acid per vertical foot of oil-bearing formation are injected into the formation.

3. The process of claim 1 wherein from about 25 to about 250 gallons of micellar dispersion per vertical foot of hydrocarbon-bearing formation are injected into the formation.

4. The process of claim 1 wherein the acid and/or micellar dispersion are permitted to remain in contact with the hydrocarbon-bearing formation for a period of time up to about six hours before being displaced out into the formation.

5. The process of claim 1 wherein the micellar dispersion is oil-external.

6. The process of claim 1 wherein a water slug is injected after the acid is injected and before the micellar dispersion is injected into the formation.

7. The process of claim 6 wherein from 0.1 to about 10 volumes of water per volume of acid is injected into the formation.

8. The process of claim 1 wherein the micellar dispersion is comprised of hydrocarbon, aqueous medium and surfactant.

9. The process of claim 8 wherein the micellar dispersion contains cosurfactant and/or electrolyte.

10. The process of claim 1 wherein the mobilities of the acid and/or micellar dispersion are at least about equal to or greater than that of the mobility of the formation fluids flowing in the hydrocarbon-bearing formation.

11. The process of claim 1 wherein the drive fluid is hydrocarbon.

12. The process of claim 1 wherein the drive fluid is aqueous medium.

13. A process of improving the productivity index of a producing well in fluid communication with a hydrocarbon-bearing formation comprising:
    (1) injecting into the well from about 1 to about 500 gallons of acid per vertical foot of hydrocarbon-bearing formation,
    (2) injecting into the well from about 1 to about 500 gallons of a micellar dispersion per vertical foot of hydrocarbon-bearing formation, (3) injecting a drive fluid into the formation in amounts sufficient to displace the acid and micellar dispersion out into the formation, and (4) permitting the well to reproduce.

14. The process of claim 13 wherein from about 0.1 to about 10 volumes of water per volume of acid are injected into the formation after the acid is injected into the formation and before the micellar dispersion is injected into the formation.

15. The process of claim 13 wherein the micellar dispersion is comprised of hydrocarbon, aqueous medium, and surfactant.

16. The process of claim 15 wherein the micellar dispersion contains cosurfactant and/or electrolyte.

17. The process of claim 13 wherein from about 5 to about 250 gallons of acid per vertical foot of oil-bearing formation are injected into the formation.

18. The process of claim 13 wherein from about 25 to about 250 gallons of micellar dispersion per vertical foot of hydrocarbon-bearing formation are injected into the formation.

19. The process of claim 13 wherein the drive fluid is hydrocarbon.

20. The process of claim 13 wherein the drive fluid is aqueous medium.

21. A process of increasing the productivity index of a producing well in fluid communication with a hydrocarbon-bearing formation comprising:

(1) injecting into the formation from about 1 to about 500 gallons of acid per vertical foot of hydrocarbon-bearing formation, (2) injecting into the formation from about 0.1 to about 10 volumes of water per volume of acid into the formation, (3) injecting into the formation from about 1 to about 500 gallons of micellar dispersion per vertical foot of hydrocarbon-bearing formation, (4) injecting a hydrocarbon drive fluid into the formation in amounts sufficient to displace the acid and micellar dispersion out into the formation, and, (5) permitting the well to reproduce.

22. The process of claim 21 wherein the acid is hydrochloric acid.

23. The process of claim 21 wherein the micellar dispersion is oil-external.

24. The process of claim 21 wherein the acid and/or micellar dispersion are permitted to remain in contact with the hydrocarbon-bearing formation for a period of time up to about 6 hours before being displaced out into the formation.

References Cited
UNITED STATES PATENTS

| | | | |
|---|---|---|---|
| 2,356,205 | 8/1944 | Blair, Jr., et al. | 166—305UX |
| 3,330,344 | 7/1967 | Reisberg | 166—274 |
| 3,467,188 | 9/1969 | Gogarty | 166—274 |
| 3,474,865 | 10/1969 | Gogarty et al. | 166—274 |
| 3,481,404 | 12/1969 | Gridley | 166—307 |
| 3,482,631 | 12/1969 | Jones | 166—273 |
| 3,483,923 | 12/1969 | Darley | 166—273X |

STEPHEN J. NOVOSAD, Primary Examiner